Patented May 29, 1934

1,960,627

UNITED STATES PATENT OFFICE 1,960,627

METHOD FOR RETARDING THE DECAY OF FISHING TWINE, NETS, AND ALLIED EQUIPMENT

Alexander Finlayson and Phillip R. Andrews, Seattle, Wash., assignors to Sealth Corporation, Seattle, Wash., a corporation of Washington No Drawing. Application October 28, 1932, Serial No. 640,054

5 Claims. (Cl. 28—1)

Our present invention relates to the art of chemical preserving means for fabrics and more particularly to a method for retarding the decay of fishing twine, nets and allied equipment.

The useful life of any fish net is largely determinable from its resistance to the rotting and decaying forces which are an unavoidable contingency of its employment both in salt and in fresh waters. And since premature deterioration through the action of marine rot is the inevitable consequence of its exposure in bacteria-infested waters it is proposed to retard, by a treatment previous to its immersion, the accretion of pernicious growths upon the net and so extend its life.

For years commercial fishermen have been accustomed to dipping both old and new nets in various solutions in an attempt to inhibit the attacks of marine organisms. Tar, bluestone, creosote, a greasy mixture known as "copper oleate" and other baths have been employed to some advantage. All of these methods have, however been attended by baleful consequences which, in many instances completely vitiate the benefits of these specious operations. Tarred nets are difficult and disagreeable to handle and when not in the water suffer to the point of uselessness from induration. Bluestone, being freely soluble is soon dispersed. Its avail is therefore transitory even if it did not of itself set up a slow disintegration of the net fibres. Again, copper oleate, by reason of its greasy properties causes knot slipping with resultant contraction and distention of the meshes. Thus it will be seen that despite many plausible attempts only results of questionable value have been obtained.

As an improvement in the art of preserving fish nets a new method is disclosed by this invention whereby a constant generation of poisonous salts is set up within the net fibres whenever such net is exposed in a medium propitious to the growth of decay-promoting organisms. The generated salts are non-injurious to the net and the medium is, of course, the waters of oceans, lakes or rivers which also represent the natural habitat of the destructive agencies considered.

This method depends upon the principle of induced chemical reactions between a metallic element and dissolved natural salts to produce soluble poisonous compounds. The metallic element and the natural salt, though separately neutral as bactericides are toxogenic, the end products of their interreactions being poisonous compounds.

As an example, we may consider copper to be the metallic element and sodium chloride, as it exists in sea water, the dissolved natural salt. Now, metallic copper is not available in its elemental state as a poison. Indeed there are some marine animals including certain invertebrates, (as arthropods and mollusks) which are capable of utilizing copper in the hæmocyanin of the blood, so that even as microscopic particles, this element must sometimes be considered salutary. Similarly, sodium chloride, so far from having noxious properties is actually wholesome, and in many cases (e. g. with the Balanoide), is necessary to existence.

Considering then, the two components, metallic copper and a 3.4 per cent solution of sodium chloride represented by the sea, we find that the former will be slowly dissolved by the latter resulting in the formation of basic copper chlorides and oxychlorides of the order:

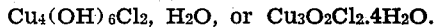

$Cu_4(OH)_6Cl_2$, $H_2O$, or $Cu_3O_2Cl_2.4H_2O$.

Due to the fact that sea water contains traces at least of almost every known element variously combined and ionized in solution, the reactions between any metal and this natural brine are very complex. The intermediate phases of their combinations cannot therefore, be accurately stated, nor can the complete series of their end products be definitely described. It is known, however, that the major compounds, such as the basic carbonates, chlorides and the oxychlorides indicated in the above formulæ are produced at a rate in excess of that of their dissociation and dispersion in the water, thus rendering any net into which metallic copper has been introduced, and also the water in the immediate vicinity of that net, poisonous and inhibitory to marine life. Now all marine animals are permeable to the salts in solution in the sea and always tend to establish and maintain osmotic equilibrium with the water. It is therefore not necessary, for destruction, that adhering animals or bacterial organisms actually deglutate and digest the generated poisons. Any that remain in the vicinity will become saturated by the process of osmosis. Many of the free-swimming larval parasites will in consequence be discouraged from intrusion by the toxic atmosphere and the unstable equilibrium in the neighborhood of the nets; other, and adhering forms will be destroyed by direct poisoning.

It is, of course, not necessary nor desirable that copper be exclusively employed as the poison-generating metal; nor must it be concluded that chlorides represent the only salts resulting from the action of the sea upon it. Mercury, for example, under certain conditions could readily be substituted, and since the ocean contains many gases in solution, as nitrogen, oxygen, hydrogen, carbon dioxide and ammonia it follows that a complex series of nitrates, oxides, carbonates and acid carbonates must result as the reaction products. In fact, most of the ocean solutes consist of ions, the aggregated ionic dissociation being over 90 per cent. Sea water will therefore contain the ions Cl, $CO_3$, $NH_3$, $NO_3$, $CO_2$ etc., from its dissociated salts and from the salt magnesium sulphate, the ion $SO_4$. Thus in the net there will be formed a considerable quantity of metallic sulphates, further augmenting its toxicity.

There are many ways in which a metal may be satisfactorily incorporated in the structure of a net or in the cord from which the net is made. The fabric may, for example, be immersed in the solution of a metallic salt from which the metal may be then deposited throughout its structure by chemical precipitation. Or it may be dipped directly into the colloidal solution of metal when the particles will migrate into the interstices between the fibres. Another method consists of first weaving into the cord a wire of non-poisonous metal, as iron, and then dipping the finished net, or the unfabricated cord in a solution of say, copper sulphate. The iron will displace the copper from solution and become copper plated. If a protracted immersion be given the fabric the iron will completely disappear and be entirely replaced by the copper. This method is recommended for the treatment of linen or other loosely woven cords.

Still another method for introducing a poison-forming metal into nets or cords is by the metal spray. In this process a shower of extremely small metallic particles are shot from a specially designed gun into the interstices of the fabric and over its surface without in any way impairing flexibility. The coating adheres with great tenacity and resists abrasion.

The simplest and most practical method is, however, to weave one or more fine wires of the poison-forming metal into the cord before fabrication of the net. This method is of course, limited to the capability of the metal being drawn into wire. Thus with copper it is quite practicable and satisfactory to use wire, and this procedure is generally preferred for the treatment of cotton or manila rope or cord. In the employment of mercury one of the other methods would be required. For the treatment of linen, the metal spray, the precipitation or the displacement methods are, due to the before mentioned looseness of the fibres, the most practicable.

It is believed that the foregoing describes a distinct departure from, and improvement over, the practice now in vogue for the preservation of fishing nets and kindred equipment. The disadvantages of tar-dipped nets are absent because the metal treatment brings about no rotting action to the net itself and the fabric will not harden but retain its flexibility when not in use. The main objection to the bluestone is removed because the poisons from the net, though gradually dissipated to the water are continually replenished by the progressive corrosion of the metal. Finally, the drawbacks attendant upon the use of "copper oleate" are not experienced because no greasy vehicle is present and there is no knot slippage. In fact, the knots are tighter, stronger and more permanent than in new, untreated nets.

The foregoing description is believed to clearly disclose a preferred embodiment of our invention but it will be understood that this disclosure is merely illustrative and that such changes in the invention may be made as are fairly within the scope and spirit of the following claims.

What we claim is:

1. A method for preserving fish nets, twine and allied equipment whereby there is incorporated in the net a metal which, when the net is exposed in fish-inhabited waters will continuously generate soluble poisonous compounds destructive and inhibitory to the net-decaying organisms.

2. A method for preserving fish nets from the attacks of marine animals and micro-organisms whereby a poison-forming metal is incorporated in the fibres of the net which, through chemical reactions with the salts or ions in the fish-inhabited water will continuously generate soluble poisonous compounds to counteract these attacks.

3. A method of preserving fish nets from marine decay whereby a toxogenic reaction is set up between a metal incorporated in the structure of the net and the free ions of the fish-inhabited water, such reaction being continuously productive of soluble bactericides.

4. A method for preserving fish nets by partially or wholly saturating the fibres with metallic particles which, when exposed to the chemical action of fish-inhabited waters will continuously generate soluble poisonous compounds and bactericides.

5. A method for preserving fishing twine, nets and allied equipment from the attacks of decaying organisms consisting of creating an unhealthy and toxic atmosphere in the immediate vicinity of the materials immersed in salt water, by incorporating in the materials to be protected, as part of their structure, a metal which, when immersed in salt water, produces continuously soluble poisonous compounds which inhibits organic accretions.

ALEXANDER FINLAYSON.
PHILLIP R. ANDREWS.